(12) United States Patent
Singh et al.

(10) Patent No.: US 10,951,531 B2
(45) Date of Patent: Mar. 16, 2021

(54) ADAPTING CONTROL PLANE POLICING PARAMETERS DYNAMICALLY

(71) Applicant: Cisco Technology, Inc., San Jose, CA (US)

(72) Inventors: Anand Kumar Singh, Cupertino, CA (US); Venkatesh Srinivasan, San Jose, CA (US); Swaminathan Narayanan, San Jose, CA (US); Anulekha Chodey, San Jose, CA (US); Ambrish Niranjan Mehta, Milpitas, CA (US); Natarajan Manthiramoorthy, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 4 days.

(21) Appl. No.: 16/215,352

(22) Filed: Dec. 10, 2018

(65) Prior Publication Data

US 2019/0116125 A1    Apr. 18, 2019

Related U.S. Application Data

(63) Continuation of application No. 15/152,971, filed on May 12, 2016, now Pat. No. 10,153,977.

(51) Int. Cl.
*H04L 12/813*   (2013.01)
*H04L 12/823*   (2013.01)
*H04L 12/855*   (2013.01)

(52) U.S. Cl.
CPC .......... *H04L 47/20* (2013.01); *H04L 47/2466* (2013.01); *H04L 47/323* (2013.01)

(58) Field of Classification Search
None
See application file for complete search history.

(56) References Cited

U.S. PATENT DOCUMENTS

| | | | |
|---|---|---|---|
| 7,952,999 B1* | 5/2011 | Jiang | H04L 63/20 370/229 |
| 8,914,497 B1 | 12/2014 | Xiao et al. | |
| 2002/0107857 A1 | 8/2002 | Teraslinna | |
| 2006/0104340 A1* | 5/2006 | Walton | H04L 1/0015 375/227 |
| 2007/0014275 A1 | 1/2007 | Bettink et al. | |
| 2007/0014276 A1* | 1/2007 | Bettink | H04L 45/00 370/351 |
| 2007/0127491 A1 | 6/2007 | Verzijp et al. | |
| 2009/0077257 A1* | 3/2009 | Savoor | H04L 41/0681 709/232 |
| 2009/0109849 A1 | 4/2009 | Wood et al. | |

(Continued)

*Primary Examiner* — Rebecca E Song
(74) *Attorney, Agent, or Firm* — Polsinelli PC

(57) ABSTRACT

Aspects of the present disclosure are directed to dynamically adjusting control plane policing throughput of low (or lower) priority control plane traffic to permit higher throughput. The drop rate for low or lower priority control plane traffic can be determined to be above a threshold value. The processor utilization can be determined to be operating under normal utilization (or at a utilization within a threshold utilization value). The control plane policing for control plane traffic for the low or lower class of service can be increased (or decreased) to permit lower class of service control traffic to be transmitted using higher class of service resources without adjusting the priority levels for the lower class of service control traffic.

20 Claims, 3 Drawing Sheets

(56) References Cited

U.S. PATENT DOCUMENTS

| | | |
|---|---|---|
| 2012/0195198 A1 | 8/2012 | Regan |
| 2014/0140244 A1 | 5/2014 | Kapadia et al. |
| 2017/0289067 A1 | 10/2017 | Lu et al. |

* cited by examiner

ADAPTING CONTROL PLANE POLICING PARAMETERS DYNAMICALLY

CROSS-REFERENCE TO RELATED APPLICATIONS

This application is a continuation of U.S. application Ser. No. 15/152,971, filed on May 12, 2016, the content of which is incorporated herein by reference in its entirety.

FIELD

This disclosure pertains to determining and adapting control plane policing (CoPP) parameters dynamically.

BACKGROUND

Control plane policing (CoPP) is used in routers and switches to protect control plane. Routers and switches can provide default CoPP functionality and an option to tune CoPP parameters. However such configuration is prone to user error and still be static in nature. Tuning of CoPP parameters relies on an understanding of the deployment scenario and the control traffic patterns. Fundamental purpose of CoPP is to provide Control plane protection. However a static CoPP can lead to inefficient usage of Control Plane Capacity and penalizing on convergence and overall system performance for certain requirements.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Figure 1:
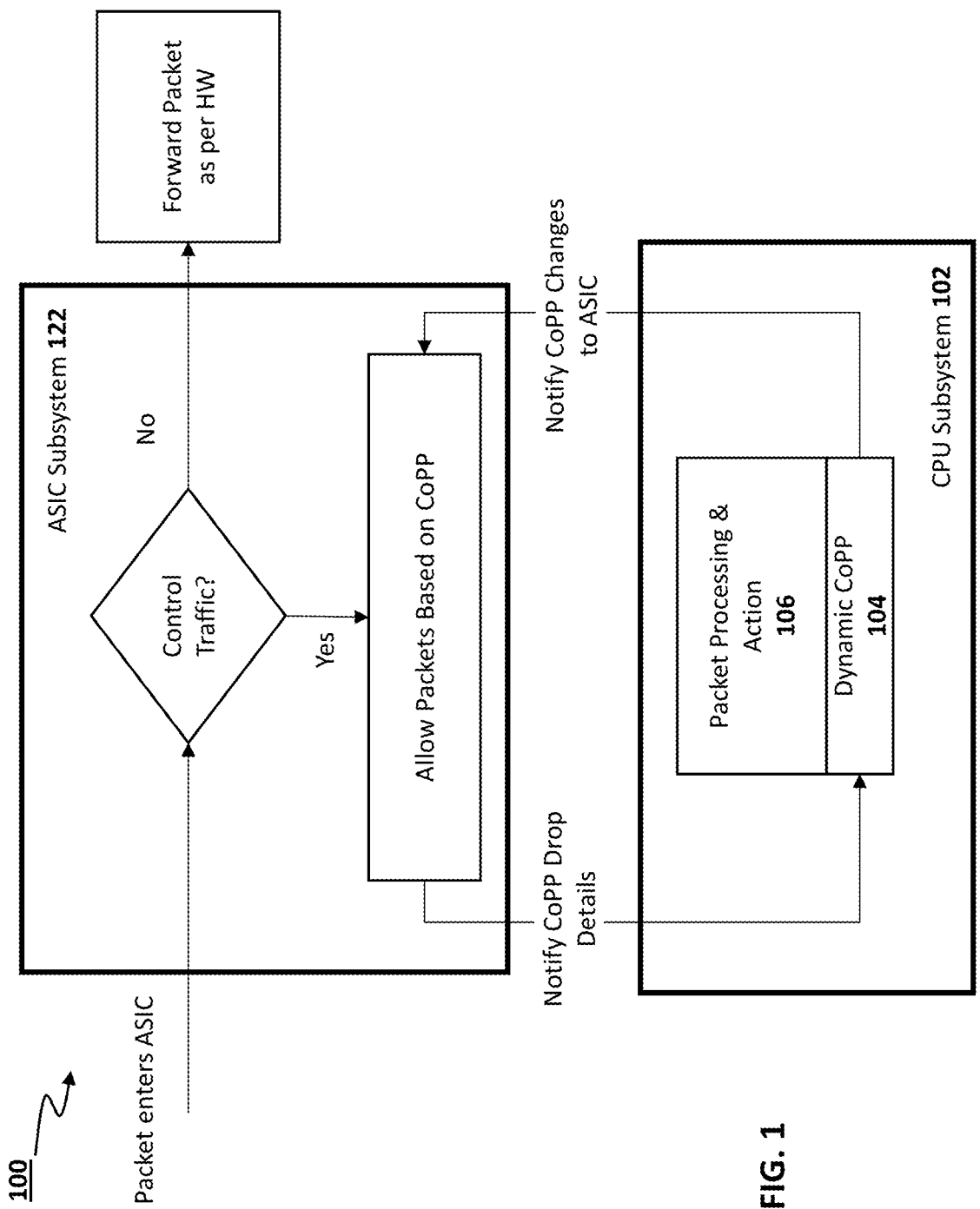
FIG. 1 is a schematic block diagram of a central processing unit (CPU) subsystem in accordance with embodiments of the present disclosure.

Aspects of the embodiments are directed to a method for dynamically adjusting a control plane policing parameter, the method including determining that a drop rate for control plane traffic for a first class of service traffic exceeds a predetermined threshold value; determining that a utilization of control plane policing for any class of service traffic is within a utilization threshold value; and adjusting the control plane policing throughput for control plane traffic for the first class of service.

Aspects of the embodiments are directed to a computer program product for dynamically adjusting a control plane policing parameter, the computer program product embodied on non-transient computer readable media and including instructions operable when executed to determine that a drop rate for control plane traffic for a first class of service traffic exceeds a predetermined threshold value; determine that a utilization of control plane policing for any class of service traffic is within a utilization threshold value; and adjust the control plane policing throughput for control plane traffic for the first class of service.

Aspects of the embodiments are directed to an apparatus that includes a hardware processor configured to receive control plane packets from an application specific integrated circuit. The apparatus is configured to determine that a drop rate for control plane traffic for a first class of service traffic exceeds a predetermined threshold value; determine that a utilization of control plane policing for any class of service traffic is within a utilization threshold value; and adjust the control plane policing throughput for control plane traffic for the first class of service.

Aspects of the embodiments are directed to a system that includes an application specific integrated circuit (ASIC) comprising hardware logic and a CPU subsystem. The ASIC is configured to receive a packet from a network location, determine that the packet is a control plane packet, and forward the packet based on a control plane policing setting. The CPU subsystem includes hardware processing logic configured to determine that a drop rate for control packets of a first class of service is above a threshold drop rate value; determine that a processor utilization is within a threshold utilization value; adjust the control plane policing setting for control plane packets of the first class of service; and instruct the ASIC to forward the packet based on the adjusted control plane policing setting.

In some implementations, adjusting the control plane policing throughput for the first class of service traffic comprises maintaining the priority level for the control plane policing for the first class of traffic.

In some implementations, adjusting the control plane policing throughput comprises adjusting the control plane policing to the minimum of a percent increase of a current throughput value or a maximum value.

In some implementations, the first class of service traffic comprises a low priority traffic class of service.

Some implementations may also include determining whether to adjust the control plane policing throughput based on determining that the control plane policing throughput is less than a maximum throughput level.

Some implementations may also include receiving a packet drop rate for control plane packets of the first traffic class from an application specific integrated circuit (ASIC).

Some implementations may also include identifying one or more control plane policing parameters, the control plane parameters comprising one or more of an instant total inband packet processing, an instant inband packet processing for a class of service, an instant CPU utilization value, an instant packet drop rate for a class of service, or a current CoPP throughput; and wherein adjusting the control plane policing throughput for control plane traffic for the first class of service comprises adjusting the control plane policing throughput for the control plane traffic of the first class of service based on the one or more control plane parameters.

In some implementations, adjusting the control plane policing throughput for control plane traffic for the first class of service comprises increasing the control plane policing throughput for control plane traffic for the first class of service.

In some implementations, adjusting the control plane policing throughput for the first class of service traffic comprises maintaining the priority level for the control plane policing for the first class of traffic.

In some implementations, adjusting the control plane policing throughput comprises adjusting the control plane policing to the minimum of a percent increase of a current throughput value or a maximum value.

In some implementations, the first class of service traffic comprises a low priority traffic class of service.

In some implementations, the apparatus may be configured to determine whether to adjust the control plane policing throughput based on determining that the control plane policing throughput is less than a maximum throughput level.

In some implementations, the apparatus may be configured to receive a packet drop rate for control plane packets of the first traffic class from an application specific integrated circuit (ASIC).

In some implementations, the apparatus may be configured to identify one or more control plane policing parameters, the control plane parameters comprising one or more of an instant total inband packet processing, an instant inband packet processing for a class of service, an instant CPU utilization value, an instant packet drop rate for a class of service, or a current CoPP throughput, and wherein the apparatus is configured to adjust the control plane policing throughput for control plane traffic for the first class of service based on the one or more control plane parameters.

In some implementations, adjusting the control plane policing throughput for control plane traffic for the first class of service comprises increasing the control plane policing throughput for control plane traffic for the first class of service.

In some implementations, the adjusting the control plane policing throughput comprises adjusting the control plane policing to the minimum of a percent increase of a current throughput value or a maximum value.

In some implementations, the CPU subsystem is configured to adjust the control plane policing throughput for control plane traffic for the first class of service by increasing the control plane policing throughput for control plane traffic for the first class of service.

This disclosure describes a central processing unit (CPU) subsystem that can learn and adjust based on real time network traffic patterns and can adapt CoPP parameters to changes in deployment. Dynamically adjusting CoPP parameters can provide an enhanced convergence and overall system performance can be improved.

Protocol traffic (such as Open Shortest Path First (OSPF), Border Gateway Protocol (BGP), Protocol Independent Multicast (PIM), etc.) and Bridge Protocol Data Unit (BPDU) class traffic (such as Spanning Tree Protocol (STP), Link Aggregation Control Protocol (LACP), etc.) fall under the critical class of traffic and are marked with higher class of service (COS) values (COS 5 to 7) and are typically unpoliced or leniently policed under CoPP policies for the healthy functioning of the network. Some of the data plane class traffic that have to be CPU processed (such as Address Resolution Protocol (ARP), Glean, Sflow, etc.) are marked with lower COS values (COS 0 to 3) and are aggressively policed to protect the CPU, which can have an impact with respect to faster convergence or application performance in scaled environments.

The CoPP thresholds are static in nature and are mostly based on the overall CPU processing and the control plane capacity of the platform (they do not consider the traffic load utilization of class critical traffic, overall inband traffic utilization etc.). This method aims at changing the thresholds of lower COS traffic based on the CoPP utilization of various protocol/BPDU class traffic thereby improving data plane convergence and application performance in scaled environments.

Data center aggregation switches can have large IPv4/IPv6 hosts behind it. For example Cisco Nexus 9000 Switch can support 90K IPv4 hosts and 40K IPv6 hosts. When there is a topology change which needs learning of these hosts via Glean and ARP traffic, allowed CoPP limit for this traffic can easily become bottleneck when control plane has unused capacity.

CoPP is defined for all possible type of control traffic in mind. In real time, a router or switch is aware of how much control traffic it is processing at this time and how much it can process. It is also aware of what drops are happening due to CoPP in place. This all can be fed to CoPP system and adjust the rate of overall packets going to control plane and in turn improve convergence. This tuning allows rates to differ than the static default parameters and at the same time not affecting anything else.

Common Example of Control traffic where CoPP tuning can help overall performance:
  a. Glean Traffic
  b. ARP/ND Traffic
  c. Multicast route miss Traffic
  d. Nat Traffic
  e. Sflow Traffic Implementation can also consider the number of active forwarding engines available on the switch and that are delegating certain control traffic to CPU. An example implementation of a forwarding engine can include an application specific integrated circuit (ASIC).

In one example, for an allowed ARP for 1500 packets/second, it may take 60 seconds or more to do ARP for 90K hosts; if the rate is increased to 3000 packets/second, convergence improves by 50%.

The following characteristics can be predefined in the system based on hardware profile:
  1. Switch inband packet processing capability in packets/seconds (system capability in pps):
  Total inband packet processing Capability=Inband_Processing(Capability,AllClasses)
  2. Switch control plane application specific packet processing capability (per class system capability in packets/second or pps) for each class (class as in CoPP profile).
  Assume there are three classes defined in the following order:
  Priority 1 class=>class1, capability=Inband_Processing (Capability,Class1)
  Priority 2 class=>class2, capability=Inband_Processing (Capability,Class2)
  Priority 3 class=>class3, capability=Inband_Processing (Capability,Class3)
  3. The measurement-interval: Interval at which drop rates are sampled at HW ASIC level and notified to Inband CPU
  4. The adjustment_threshold: A numeric value which determines dynamic CoPP update trigger for a given class [This can be a per class value or global value]
  5. Rate_of_Increase: This defines % increase in CoPP from its current value
  6. The dynamic CoPP is triggered only when CPU usage is normal (this value is predefined).
  7. All predefined values can come from system default or a template which users can tune further.

The following parameters can be monitored and/or measured and can be used by the CPU subsystem to dynamically adjust the CoPP parameters:
  1. Instant total inband packet processing=Inband_Processing(Instant,AllClasses)
  2. Instant inband packet processing for a class=Inband_Processing(Instant,<Class>)

3. Instant CPU utilization=CPU_Utilization(Instant)
4. Instant drop rate=CoPP_Drop_Rate(Instant,<Class>)
5. Current CoPP=Current_CoPP(Instant,<Class>)
6. Instant CoPP drop rate for each class is known at ASIC hardware. This should be normalized in packets per second (PPS) and notified to control plane cpu at a predefined interval.
7. CoPP_drop: Boolean set to TRUE if there are packet drop due to CoPP at ASIC and FALSE otherwise Actions Taken:

When the Sup application determines a drop rate for adjustment_threshold times—it should update allowed CoPP as below:

>  if CPU_Utilization(Instant)=='normal':&&
>  CoPP_DROP=TRUE:
>
>  if CoPP_Drop_Rate(Instant,<Class>)>a threshold
>  (which could be zero) &&
>
>  Inband_Processing(Instant,<AllClasses>)<
>  Inband_Processing(Capability,AllClasses) &&
>
>  Current_CoPP(Instant,<Class>)<Maximum_CoPP
>  (Capability,<Class>), then:
>
>  Adjusted_CoPP(Instant,<Class>)=min
>  [Current_CoPP(Instant,<Class>)+
>  Rate_of_Increase*Current_
>  CoPP(Instant,<Class>),Maximum_CoPP(Capability,<Class>)]

Competing Classes:

There can be different classes which needs attention at a given time. System should act on the classes on a predefined priority. For example: ARP class should be handled at better priority than glean. ARP drops will create re-ARP and hosts will have to reply multiple times. If Inband_Processing (Instant,AllClasses) has reached its maximum capacity then additional check should be done for dynamically modified lower priority CoPP classes so that allowed rate can be reduced to make room for higher priority CoPP class.

Control Actions:

Once Adjusted_CoPP(Instant,<Class>) for each class is known, push it to CoPP module on hardware ASIC and reset adjustment_threshold. In multiple forwarding engine system (For example modular switches), adjustment can be made only to the specific forwarding engine(s), where drop was seen to have finer control to improve convergence. At this time CoPP adjustment cycle is complete and wait for further feedback from the hardware ASIC.

Turning now to FIG. 1, FIG. 1 is a schematic block diagram of a CPU subsystem 102 in accordance with embodiments of the present disclosure. FIG. 1 shows a CPU subsystem 102 and an application specific integrated circuit (ASIC) 122.

The ASIC 122 can be part of a router, such as that of a datacenter or other network configuration. The ASIC 122 can be configured to receive packets from a source location and determine information about the packet. For example, the ASIC 122 can determine whether the packet includes data traffic or whether the packet includes control traffic. The ASIC 122 can forward the control packet based on a control plane policing (CoPP) setting.

In some embodiments, the ASIC can provide information to the control plane policing processor 102. The information can include control packet drop rate information for each class of service the ASIC 122 is monitoring.

The CPU subsystem 102 can determine an instant CPU utilization. The CPU subsystem 102 can determine whether the instance CPU utilization is within a threshold utilization value. For example, the CPU subsystem 102 can determine that the instance CPU utilization is operating within normal parameters and not being overused or overdriven. The CPU subsystem 102 can also determine a drop rate of control plane packets for one or more classes of service. If the drop rate is above a threshold value (e.g., above a predetermined number of dropped packets), and the CPU utilization is normal, then the CPU subsystem 102 can adjust the CoPP settings to increase the throughput of control plane packets of a low or lower class of service. The CPU subsystem 102 need not make changes to priority levels of the dropped packets; instead, by increasing the packets per second throughput of lower class of service control plane packets, fewer packets will be dropped.

Other factors can be used by the CPU subsystem 102 for adjusting the CoPP throughput for a control plane packet class of service include:

Instant total inband packet processing;
Instant inband packet processing for a class of service;
Instant CPU utilization;
Instant drop rate (total and/or for each traffic class of service);
Current_CoPP throughput;
Available throughput for the current class of service; and
Available throughput for each class of service.

If the CPU utilization is within a threshold utilization value (e.g., the CPU utilization is normal), and if the drop rate for a control plane packet of a class of service is greater than a predetermined drop rate threshold and if the inband processing utilization rate for the class of service is less than a total processing capability for all classes of service served by the CPU, and if the current CoPP throughput is less than a maximum value, then the CPU subsystem can increase the CoPP for the control plane traffic of a traffic class of service. For example, the adjusted CoPP throughput can be raised to a maximum CoPP throughput available for that class of service. In some embodiments, a percentage increase can be applied to the current CoPP throughput. In some embodiments, each of the above can be determined, and the minimum value can be determined and applied to adjust the CoPP throughput. For example:

>  Adjusted_CoPP(Instant,<Class>)=min[Current_CoPP
>  (Instant,<Class>)+
>  Rate_of_Increase*Current_CoPP(Instant,
>  <Class>),Maximum_CoPP(Capability,<Class>),
>  Maximum_CoPP(Capability,AnyClass)].

Figure 2:
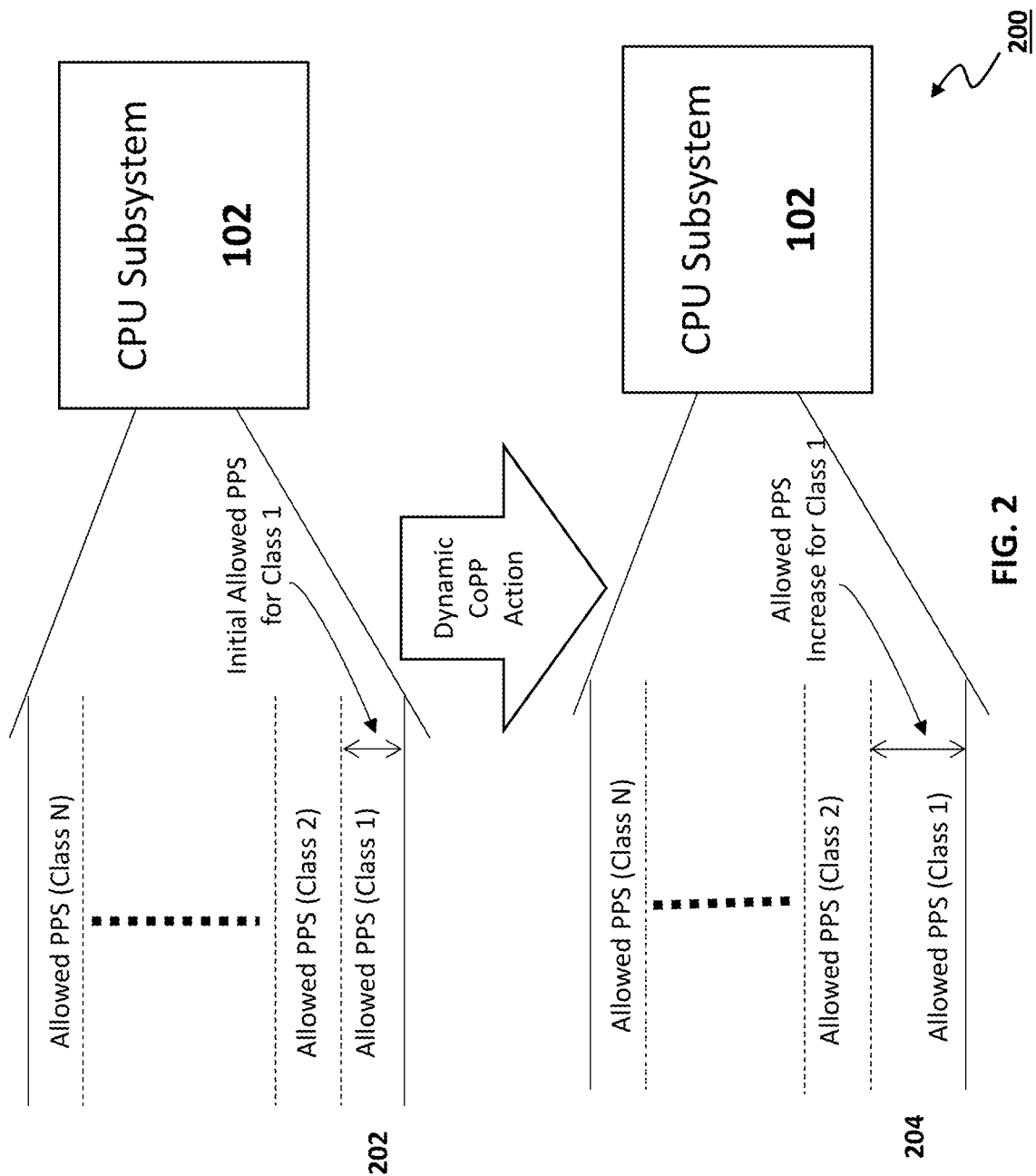
FIG. 2 is a schematic block diagram of a control plane policing dynamic parameter adjustments in accordance with embodiments of the present disclosure.

FIG. 2 is a schematic block diagram of a CPU subsystem that can dynamically adjust CoPP throughput in accordance with embodiments of the present disclosure. The CPU subsystem can control the packet per second CoPP throughput on a per traffic class of service basis. For example, for Class 1, the allowed throughput (in PPS) 202 can have a starting value. Through dynamic adjustments, the CPU subsystem 102 can increase the CoPP throughput for Class 1 (shown as allowed PPS (class 1) 204).

Figure 3:
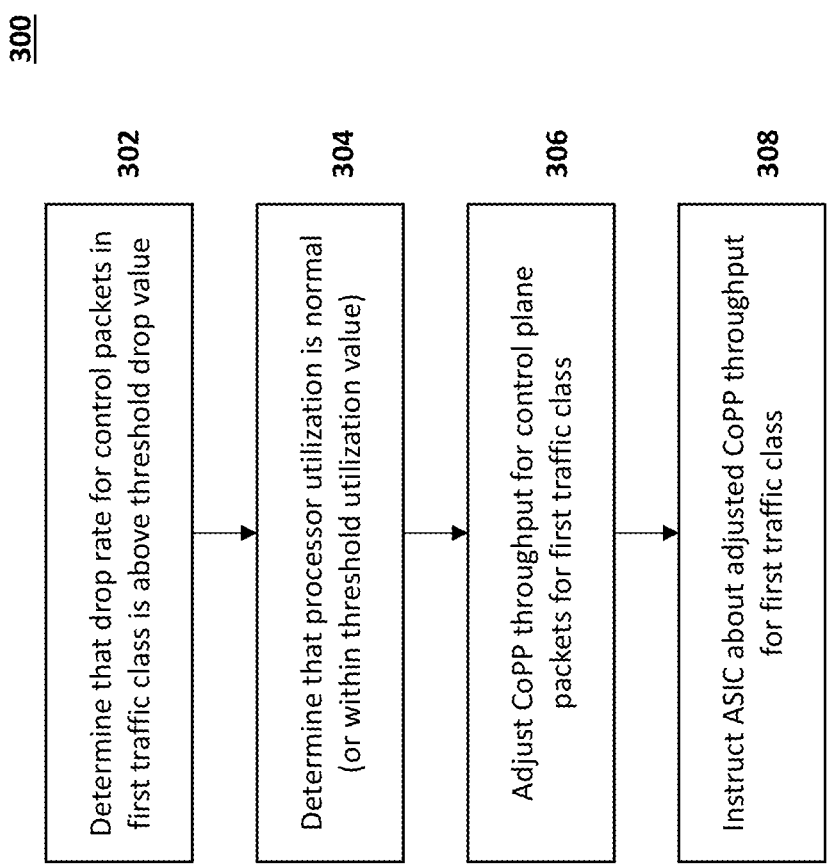
FIG. 3 is a process flow diagram for dynamically adjusting control plane policing parameters in accordance with embodiments of the present disclosure.

FIG. 3 is a process flow diagram 300 for dynamically adjusting control plane policing parameters in accordance with embodiments of the present disclosure. A CPU subsystem can receive from an ASIC information about packet drop rates for a control plane traffic class of service. The CPU subsystem can determine that the drop rate for control plane packets for a class of service is above a threshold value (302). The CPU subsystem can determine that the CPU utilization is operating under normal conditions (e.g., that the CPU utilization is within or under a threshold utilization value) (304). The CPU subsystem can adjust the CoPP throughput to increase the throughput to forward more control plane packets of a specific control traffic class of service (306). The CPU subsystem can instruct the ASIC as to the adjusted throughput for the class of service (308).

In some embodiments, the CPU subsystem can also make a determination that the instant inband processing for all traffic classes of service is less than the inband processing capability for all classes of service (e.g., to ensure that processing capability is available to handle the increased throughput). Additionally, the CPU subsystem can determine that the current CoPP throughput is less than the maximum throughput available for the traffic class or for all traffic classes.

The CPU subsystem can use any of the above information when making a determination as to how to adjust the CoPP throughput and by how much to adjust the CoPP throughput.

The CPU subsystem can adjust the throughput to a maximum value (e.g., to a maximum value available for the traffic class or to a maximum value for any traffic class). In some embodiments, the CPU subsystem can use a percentage increase. In some embodiments, the minimum value is used so as to preserve throughput capacity, such that:

Adjusted_CoPP(Instant,<Class>)=min[Current_CoPP (Instant,<Class>)+ Rate_of_Increase*Current_CoPP(Instant, <Class>),Maximum_CoPP(Capability,<Class>)].

In some embodiments, adjusting the throughput for a traffic class includes decreasing throughput. For example, as drop rates decrease and/or as the CPU utilization increases beyond an acceptable level, the CPU subsystem can decrease the CoPP throughput for the traffic class, such that:

Adjusted_CoPP(Instant,<Class>)=max[Current_CoPP (Instant,<Class>)– Rate_of_Decrease*Current_CoPP(Instant, <Class>),Minimum_CoPP(Capability,<Class>)], where the rate of decrease can be expressed as a positive percentage, and the Adjusted_CoPP can be a current value decreased by some percentage or can be decreased to the minimum value for that traffic class.

Embodiments of the present disclosure, for example, are described above with reference to block diagrams and/or operational illustrations of methods, systems, and computer program products according to embodiments of this disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and are the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

What is claimed is:

1. A method for dynamically adjusting a control plane policing throughput, the method comprising:
   determining, via hardware processing logic, whether a first factor is at or below a first threshold value;
   determining, via the hardware processing logic, whether a second factor is at or below a second threshold value;
   when the first factor exceeds the first threshold value and the second factor does not exceed the second threshold value, increasing, via the hardware processing logic, a control plane policing (CoPP) throughput for control plane traffic for a class of traffic based on one or more parameters to cause the first factor to be at or below the first threshold value; and
   when the first factor changes and the second factor exceeds the second threshold value, decreasing, via the hardware processing logic, the CoPP throughput to cause the second factor to be at or below the second threshold value.

2. The method of claim 1, wherein the increasing of the CoPP throughput for the class of traffic includes maintaining a priority level for the class of traffic.

3. The method of claim 1, wherein the increasing of the CoPP throughput includes adjusting the CoPP to a minimum of a percent increase of a current throughput value or a maximum value.

4. The method of claim 1, further comprising:
   identifying, via the hardware processing logic, the one or more parameters, the one or more parameters including one or more of an instant total inband packet processing, an instant inband packet processing for a class of service, an instant CPU utilization value, an instant packet drop rate for a class of service, or a current CoPP throughput.

5. The method of claim 1, further comprising:
   determining whether to adjust the CoPP throughput based on determining that the CoPP throughput is less than a maximum throughput level.

6. The method of claim 1, further comprising:
   receiving a packet drop rate for control plane packets of the class of traffic from an application specific integrated circuit (ASIC).

7. The method of claim 1,
   wherein,
   the one or more parameters include an instant inband packet processing for a class of service, an instant CPU utilization value, and a current CoPP throughput.

8. The method of claim 1, wherein the CoPP throughput is increased by a fixed percentage.

9. An apparatus comprising:
   a hardware processor configured to receive control plane packets from an application specific integrated circuit; and
   hardware processing logic stored in a non-transitory computer readable medium and configured to cause the hardware processor to:
   determine whether a first factor is at or below a first threshold value, determine whether a second factor is at or below a second threshold value, increase a control plane policing (CoPP) throughput for control plane traffic for a class of traffic based on one or more parameters when the first factor exceeds the first threshold value and the second factor does not exceed the second threshold value, and decrease the CoPP throughput to cause the second factor to be at or below the second threshold value when the first factor changes and the second factor exceeds the second threshold value.

10. The apparatus of claim 9, wherein increasing the CoPP throughput for the class of traffic includes maintaining a priority level for the class of traffic.

11. The apparatus of claim 9, wherein increasing the CoPP throughput includes adjusting the CoPP to a minimum of a percent increase of a current throughput value or a maximum value.

12. The apparatus of claim 9, wherein the class of traffic includes a low priority traffic class of service.

13. The apparatus of claim 9, wherein the apparatus is configured to determine whether to adjust the CoPP throughput based on determining that the CoPP throughput is less than a maximum throughput level.

14. The apparatus of claim 9, wherein the apparatus is configured to receive a packet drop rate for control plane packets of the class of traffic from the application specific integrated circuit.

15. The apparatus of claim 9,
wherein,
the apparatus is configured to identify one or more CoPP parameters,
the one or more CoPP parameters include at least one of an instant total inband packet processing, an instant inband packet processing for a class of service, an instant CPU utilization value, an instant packet drop rate for the class of service, or a current CoPP throughput, and the apparatus is configured to adjust the CoPP throughput for the control plane traffic for the class of traffic based on the one or more CoPP parameters.

16. A system comprising:
an application specific integrated circuit (ASIC) comprising hardware logic stored in a non-transitory computer readable medium and configured to:
receive a packet from a network location,
determine that the packet is a control plane packet, and
forward the packet based on a control plane policing (CoPP) setting; and
a central processing unit (CPU) subsystem comprising hardware processing logic stored in the non-transitory computer readable medium and configured to:
determine whether a first factor is at or below a first threshold value,
determine whether a second factor is at or below a second threshold value,
increase a CoPP throughput for control plane traffic for a class of traffic based on one or more parameters when the first factor exceeds the first threshold value and the second factor does not exceed the second threshold value, and
decrease the CoPP throughput to cause the second factor to be at or below the second threshold value when the first factor changes and the second factor exceeds the second threshold value.

17. The system of claim 16, wherein the CoPP setting is adjusted to a minimum of a percent increase of a current throughput value or a maximum value.

18. The system of claim 16, wherein increasing of the CoPP throughput for the class of traffic includes maintaining a priority level for the class of traffic.

19. The system of claim 16, wherein the class of traffic includes a low priority traffic class of service.

20. The system of claim 16, wherein increasing the CoPP throughput includes adjusting the CoPP to a minimum of a percent increase of a current throughput value or a maximum value.

* * * * *